Feb. 26, 1946.  A. A. METTERT  2,395,636
AUTOMATIC UNIDIRECTIONAL GEAR
Filed Sept. 14, 1945
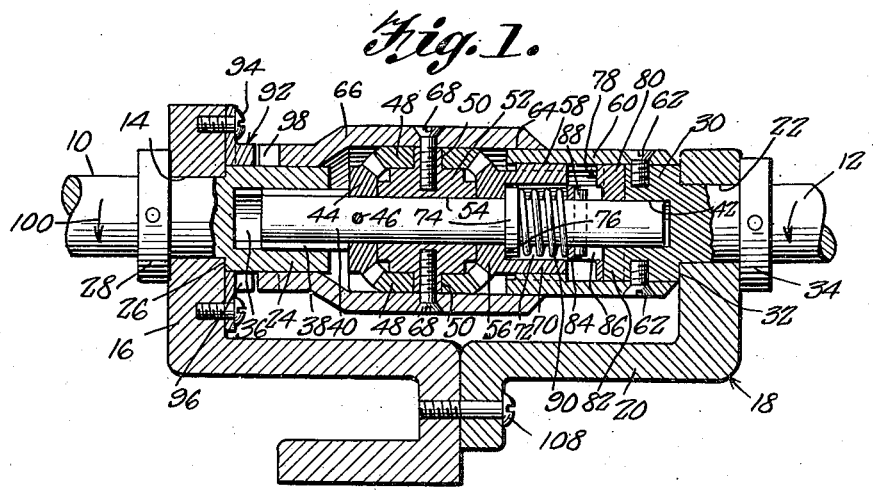
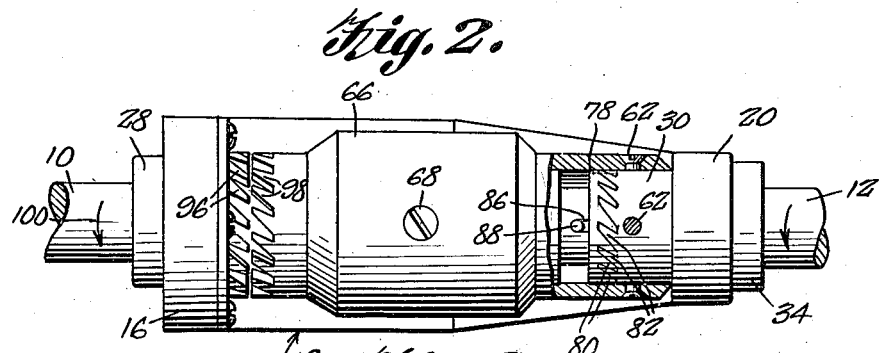
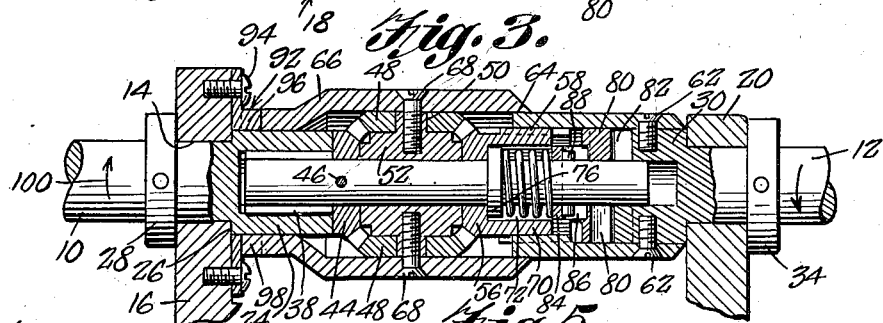
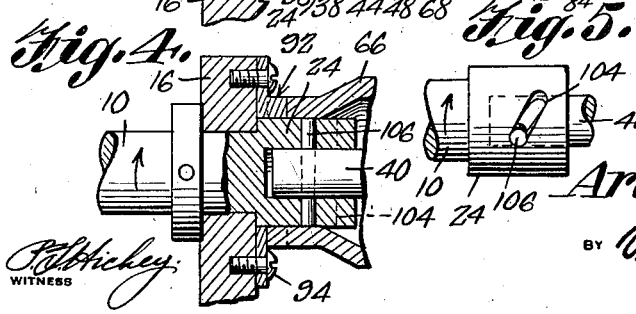
Arthur A. Mettert, INVENTOR Patented Feb. 26, 1946

2,395,636

UNITED STATES PATENT OFFICE 2,395,636

AUTOMATIC UNIDIRECTIONAL GEAR

Arthur A. Mettert, Washington, D. C.

Application September 14, 1945, Serial No. 616,219

4 Claims. (Cl. 74—367)

My invention relates to the transmission of power and has among its objects and advantages the provision of an improved automatic unidirectional gear.

An object of my invention is to provide a gear for operatively connecting a drive shaft with a driven shaft in which the gear embodies novel means for driving the driven gear in one direction only regardless of the direction of rotation of the drive shaft.

A further object is to provide a device of the type described in which the drive and driven shafts may be axially aligned and operatively connected through the medium of a gear designed to rotate the driven shaft in a given direction only regardless of forward or reverse rotation of the drive shaft.

Another object is to provide an automatic unidirectional gear embodying a novel floating clutch mechanism so designed as to be actuated through reverse rotation of the drive shaft for continuing the rotation of the driven shaft in the same direction. The gear embodies novel means designed to protect the operating parts from breakage. The invention embodies relatively few parts compactly arranged to provide an efficient and durable assembly.

In the accompanying drawing:

Figure 1 is a longitudinal sectional view of my invention;

Figure 2 is a top plan view with a part removed for the sake of clearness;

Figure 3 is a view similar to Figure 1 but illustrating the position of the gear when the drive shaft is rotated in a reverse direction;

Figure 4 is a sectional detail view of a modified detail of my invention; and

Figure 5 is a fragmentary detail view of a portion of the structure illustrated in Figure 4.

In the embodiment selected to illustrate my invention, I make use of a drive shaft 10 and a driven shaft 12 axially aligned as illustrated in Figure 1. Drive shaft 10 is rotatably journaled in the bore 14 of the section 16 of a bracket 18 constituting a support for the invention. Section 20 of the bracket 18 is provided with a bore 22 for rotatably journaling the driven shaft 12. An enlarged head 24 is formed integrally with the drive shaft 10 and has its shoulder 26 bearing against one face of the section 16. Upon the drive shaft 10 I key a collar 28 which bears against the opposite face of the section 16. Thus the drive shaft 10 is restrained from relative longitudinal movement but is rotatably supported by the section 16. One end of the driven shaft 12 includes an integral clutch head 30 having a shoulder 32 bearing against one face of the section 20. The collar 34 is keyed to the shaft 12 and cooperates with the shoulder 32 for restraining relative longitudinal movement of the shaft, but the shaft is free to rotate.

Head 24 is provided with an axial bore 36 having splined connection at 38 with a shaft 40. The opposite end of the shaft 40 is rotatably supported inside a bore 42 in the clutch head 30. To the shaft 40 I connect a bevel gear 44 through the medium of a key 46, and the gear 44 is arranged in mesh with bevel gears 48 rotatably mounted on shanks 50 secured by a mounting block 52 having a bore 54 for loosely receiving the shaft 40. Bevel gears 48 are arranged in mesh with a bevel gear 56 loosely mounted on the shaft 40 and splined at 58 to a housing section 60 fixedly connected with the clutch head 30 through the medium of screws 62. Housing section 60 is telescopically arranged at 64 within one end of a housing section 66 comprising a clutch part. Housing section 66 carries two screws 68 extending through bores in the trunnions 50 and threaded into the mounting block 52.

Hub 70 of the gear 56 is bored at 72 for housing a flange 74 formed integrally on the shaft 40 and lying against the face 76 of the hub. Gear 56 is restrained from movement longitudinally of the shaft 40 by reason of the flange 74 and the mounting block 52. Gear 44 is keyed to the shaft 40 and the mounting block 52 lies adjacent the gear. Thus the gear assembly is restrained from relative movement longitudinally of the shaft 40.

Upon the shaft 40 I mount a clutch member 78 having angular dogs 80 arranged for connection with the angular dogs 82 on the clutch head 30. The hub 84 of the clutch member 78 is slotted at 86 for the reception of pins 88 fixedly connected with the shaft 40. Hub 84 aligns with the bore 72 and may be inserted therein for accommodating disconnection of the clutch part 78 from the clutch head 30. Pins 88 key the clutch part 78 to the shaft 40 for rotation therewith, but the slots 86 permit the clutch part 78 to be shifted longitudinally of the shaft 40. Between the flange 74 and the hub 84 I position a compression spring 20. To the section 16 I connect a clutch part 92 by means of screws 94, which clutch part includes angular teeth 96 arranged to have interfitting relation with the angular teeth 98 on the clutch housing part 66 when the latter is shifted from the position of Figure 1 to that illustrated in Figure 3. Clutch part 92 is fixedly connected with the section 16 while the section 16 comprises a part of the bracket 18 which in turn is fixedly connected with a suitable support.

For the purpose of illustration we may assume that the forward rotation of the drive shaft 10 is in the direction indicated by the arrow 100. When rotated in this direction, shaft 40 is rotated in the same direction. Such rotation of the shaft 40 imparts rotary motion to the clutch part 78 because of the pins 88. The angular relation between the dogs 80 and 82 is such as to effectively hold the clutch part 78 in connected relation with the clutch head 30 during rotation of the clutch part 78 in the direction of the arrow 100. Clutch head 30 is fixedly related to the driven shaft 12 so as to cause rotation thereof in the same direction as that indicated by the arrow 100. During forward rotation of the drive shaft 10 clutch part 78 will remain in connected relation with the clutch head 30 for driving the driven shaft in the same direction. With the clutch parts in connected relation according to Figures 1 and 2, the clutch housing part 60 will rotate with the shaft 40.

Should the direction of rotation of the shaft 10 be reversed, the rear faces of the teeth or dogs 80 will react upon the rear faces of the dogs 82 and move the shaft 40 to the left when viewing Figures 1 and 2. Spring 90 is of sufficient tension to shift the shaft 40 and the gear assembly together with the clutch housing part 66. Dogs 96 and 98 are reversed with respect to the dogs 80 and 82 so as to be brought into positive driving relation as the dogs 80 and 82 are being moved on to driving relation. The pressure bearing faces of the dogs 96 and 98 are so angularly related as to hold the dogs in effective connected relation. Dogs 96 and 98 will become fully engaged immediately upon complete disengagement of the dogs 80 from the dogs 82. The angular relation between the cooperating dogs in each set is such as to draw the cooperating clutch parts together and prevent any separation therebetween so long as a load is applied. This feature provides a noiseless operation in addition to an effective connection.

As the clutch housing 66 is moved into connected relation with the clutch part 92, rotation of the drive shaft 10 in the opposite direction will rotate the shaft 40 in the same direction. Bevel gear 44 will rotate the gears 48 upon the trunnions 50 and the rotation of these gears is such as to rotate the gear 56 in the direction of the arrow 100. Since the gear 56 is splined to the housing section 60 and the latter is keyed to the clutch head 30 the driven shaft 12 will be rotated in the same direction as when the drive shaft 10 is rotated in the direction of the arrow 100.

Rotation of the drive shaft 10 in the direction of the arrow 100, after a period of reverse rotation, will cause the dogs 98 to shift the clutch housing 66 to the right when viewing Figures 1 and 2, thereby again bringing the clutch part 78 into connected relation with the clutch head 30. Compression spring 90 performs a cushioning function should either set of the clutch dogs fail to mesh immediately upon being brought into contacting relation. Spring 90 will yield under such conditions during the disconnecting action of either set of clutch dogs so as to remove strain from the parts. Such a condition is a momentary one and does not continue for any long period of time. Relative rotation between the clutch dogs being engaged will immediately bring the dogs into meshing relation.

Figures 4 and 5 disclose a modified form of connection between the shaft 40 and the head 24. Head 24 is provided with diagonal slots 104 for the reception of pins 106 fixedly connected with the shaft 40. While the head 24 and the shaft 40 are connected for limited relative rotary movement, pins 106 provide means for keying the two parts together so that they will rotate as a unit. The slots are so angularly arranged as to impart relative axial movement to the shaft 40 so as to positively shift the clutch head 78 or the clutch sleeve 66 into connected relation with their respective clutch parts. In cases where relatively light loads are effective on the driven shaft, a construction according to Figures 4 and 5 is an advantage in that it provides positive shifting.

My invention is applicable to many arts. As an example, the unit may be incorporated in counters, speedometers and the like to the end that the driven shaft or unit will always be rotated in one direction regardless of the direction of rotation of the actuating means.

During rotation of the drive shaft in a forward direction, the driven shaft is rotated in the same direction while at the same time eliminating any movement of parts or rotation of gears other than as a solid shaft. When the drive member is rotated in a reverse direction, the clutch housing 66 is floated endwise into engagement with the stationary clutch part 92, which restrains further rotary motion of the housing in addition to putting the planetary gearing in motion for continuing rotation of the driven shaft in the forward direction.

Sections 16 and 20 are interconnected into a unitary structure by bolts 108.

I claim:

1. In a unidirectional gear, the combination of a rotative drive member, a rotative driven member arranged in axial alignment with said rotative drive member, a shaft arranged in axial alignment with said rotative drive and driven members and having one end splined to the rotative drive member and its other end rotatably related to the rotative driven member, a spline element fixedly related to said rotative driven member, a housing slidably related to said rotative drive member and said spline element, a mount fixedly related to said housing and loosely mounted on said shaft, said mount being provided with opposed pivots, bevel gears rotatably mounted on said pivots, a third gear keyed to said shaft and meshing with said bevel gears, a fourth gear mounted on said shaft in mesh with said bevel gears and having splined connection with said spline element, a dog clutch part fixedly related to said rotative driven member, a companion dog clutch part splined to said shaft for engagement with said first dog clutch part to rotate the rotative driven member in a given direction upon rotation of the rotative drive member in the same direction, a fixed dog clutch part, and dog clutch means carried by said housing for engagement with said fixed dog clutch part when said rotative drive member is rotated in a reverse direction for rotating the rotative driven member in said given direction.

2. In a unidirectional gear, the combination of a rotative drive member, a rotative driven member arranged in axial alignment with said rotative drive member, a shaft arranged in axial alignment with said rotative drive and driven members and having one end splined to the rotative drive member and its other end rotatably related to the rotative driven member, a spline element fixedly related to said rotative driven member, a housing slidably related to said rotative drive member and said spline element, a mount movably mounted on said shaft inside said housing and connected with the latter for rotation therewith as a unit, a pair of gears rotatably carried by said mount, a first gear keyed to said shaft and meshing with one of said pair of gears, a second gear carried by said shaft and having splined connection with said spline element, a dog clutch part fixedly related to said rotative driven member, a companion dog clutch part splined to said shaft for engagement with said first-mentioned dog clutch part to rotate the rotative driven member in a given direction, a fixed dog clutch part, and dog clutch means carried by said housing for engagement with said fixed dog clutch part when said rotative drive member is rotated in a reverse direction for rotating the rotative driven member in said given direction.

3. In a unidirectional gear, the combination of a rotative drive member, a rotative driven member arranged in axial alignment with said rotative drive member, a shaft arranged in axial alignment with said rotative drive and driven members and having one end splined to the rotative drive member and its other end rotatably related to the rotative driven member, a spline element fixedly related to said rotative driven member, a housing slidably related to said rotative drive member and said spline element, a mount movably mounted on said shaft inside said housing and connected with the latter for rotation therewith as a unit, a pair of gears rotatably carried by said mount, a first gear keyed to said shaft and meshing with one of said pair of gears, a second gear carried by said shaft and having splined connection with said spline element, a dog clutch part fixedly related to said rotative driven member, a companion dog clutch part splined to said shaft for engagement with said first-mentioned dog clutch part to rotate the rotative driven member in a given direction, a fixed dog clutch part, dog clutch means carried by said housing for engagement with said fixed dog clutch part when said rotative drive member is rotated in a reverse direction for rotating the rotative driven member in said given direction, and cam means cooperable with said rotative drive member and said shaft for shifting all said gears and said housing as a unit upon reverse rotation of the rotative drive member for effecting connection and disconnection of the respective clutch parts.

4. In a unidirectional gear, the combination of a rotative drive member, a rotative driven member arranged in axial alignment with said rotative drive member, a shaft arranged in axial alignment with said rotative drive and driven members and having one end splined to the rotative drive member and its other end rotatably related to the rotative driven member, a spline element fixedly related to said rotative driven member, a housing slidably related to said rotative drive member and said spline element, a mount fixedly related to said housing and loosely mounted on said shaft, said mount being provided with opposed pivots, bevel gears rotatably mounted on said pivots, a third gear keyed to said shaft and meshing with said bevel gears, a fourth gear mounted on said shaft in mesh with said bevel gears and having splined connection with said spline element, a clutch part fixedly related to said rotative driven member, a companion clutch part splined to said shaft for engagement with said first-named clutch part to rotate the rotative driven member in a given direction upon rotation of the rotative drive member in the same direction, a fixed clutch part, and clutch means carried by said housing for engagement with said fixed clutch part when said rotative drive member is rotated in a reverse direction for rotating the rotative driven member in said given direction.

ARTHUR A. METTERT.